Nov. 29, 1966 K. E. B. KRUTZIKOWSKY 3,288,520

COLLAPSIBLE TRAILER

Filed Feb. 4, 1966 2 Sheets-Sheet 1

INVENTOR.
Klaus E. B. Krutzikowsky
BY Charles F Lind
Attorney

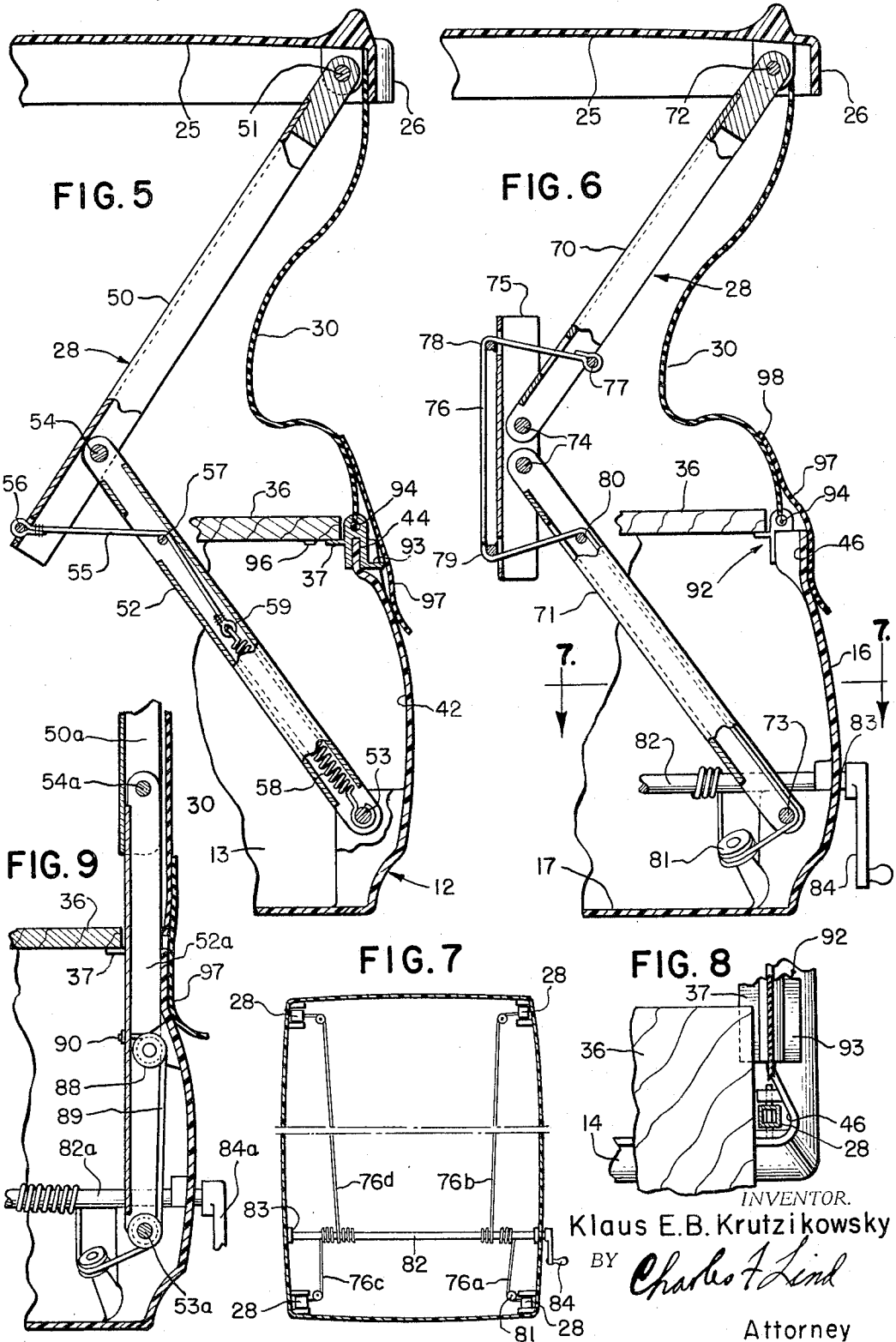

3,288,520
COLLAPSIBLE TRAILER
Klaus E. B. Krutzikowsky, 4331 N. Lowell, Chicago, Ill.
Filed Feb. 4, 1966, Ser. No. 525,228
9 Claims. (Cl. 296—23)

This invention relates to a trailer having an opened-top body and a collapsible roof, and more particularly, to improved roof supports mounted on the insides of the roof and body and collapsible toward the center of the body adjacent the front and rear walls thereof to be hidden from view in the collapsed condition of the trailer. This invention further relates to an improved trailer body formed of an expandible A.B.S. plastic as a single unit including integral front, rear and side walls and floor element.

Collapsible trailers, such as are commonly used for camping, generally include an open top body and roof and side closure means therefor that is expandable from the trailer closed position to provide a liveable trailer interior. Generally, supports, such as arms secured to the body, operate to elevate, support and lower the roof and side closure means of the trailer. The supports are typically on the outside of the body to permit a full sized bed to fit within the trailer interior while yet maintaining an overall trailer width less than 80 inches as required by many state laws. The exteriorly mounted supports not only hinders the appearance of the trailer but also reduces the possible designs of mechanical assists for opening and closing the trailer.

Accordingly, an object of this invention is to provide a collapsible trailer having the supports for the roof and side closure means confined entirely within the trailer body in the trailer closed position.

Another object of this invention is to provide an improved trailer according to the previous object further having a bed frame extended across the width of the trailer and supported to move between the erected supports when the trailer is opened.

Another object of this invention is to provide structure for supporting the bed frame, which structure further includes means integral therewith for supporting the roof in the trailer closed position and for holding the side closure means to the body.

Another object of this invention is to provide collapsible supports each including interconnected posts hinged, respectively, to the body and roof on axes disposed longitudinally of the trailer and being collapsible toward the center of the trailer to close the trailer.

Another object of this invention is to provide improved mechanical assist means for opening and closing the trailer, including a tension line secured to one of the posts and pulling means having a pulling force sufficient to counterbalance generally the weight of the roof and side closure means of the trailer.

Another object of this invention is to provide a collapsible trailer having outwardly directed recesses formed in the side walls of the body adjacent the supports for receiving the supports in the trailer opened position and spacing them apart across the inside width of the body a minimum distance exceeding the length of the bed frame while not increasing the normal width of the body.

Another object of this invention is to provide an improved trailer body formed by an A.B.S. plastic vacuum molded as an integral unit including integral floor and front, rear and side walls.

These and other objects will be more fully appreciated after reviewing the subject specification including the drawings as a part thereof, wherein.

Figure 1:
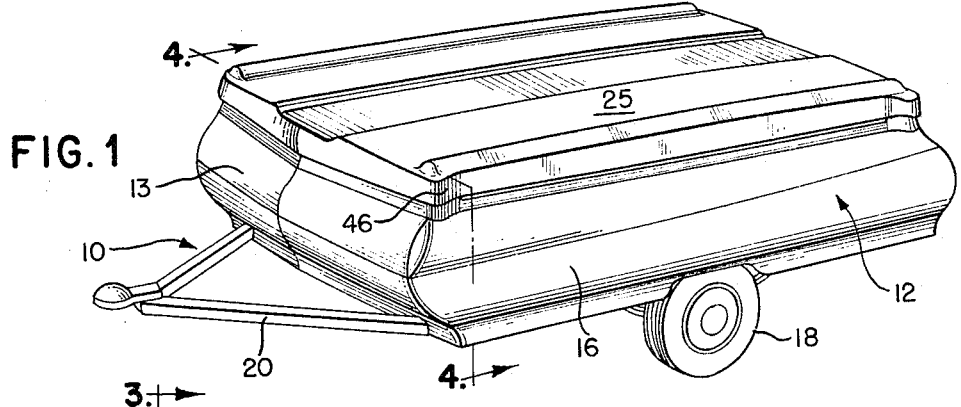
FIG. 1 is a prospective view of the subject collapsible trailer shown in the closed condition.
Figure 2:
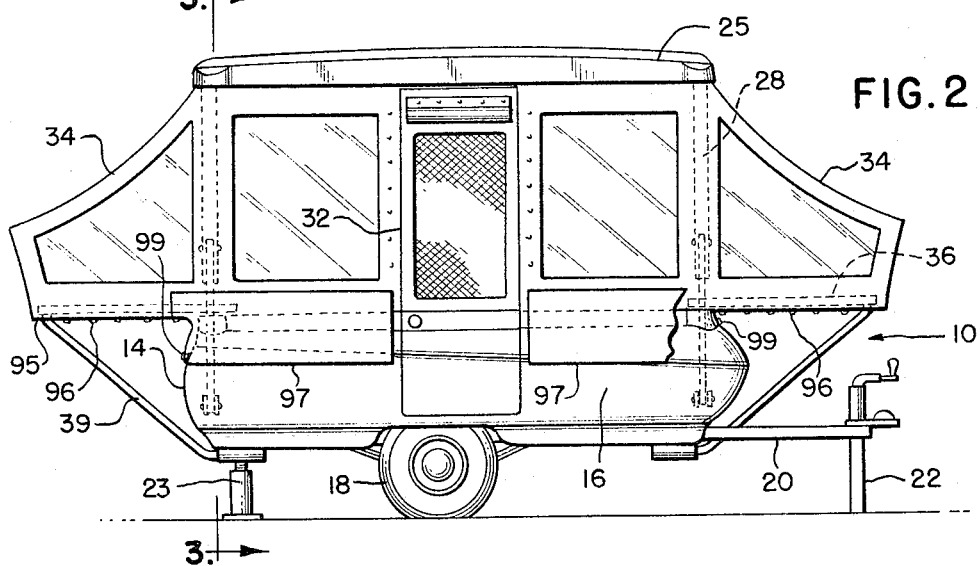
FIG. 2 is a side elevational view of the subject trailer shown in the opened condition.
Figure 3:
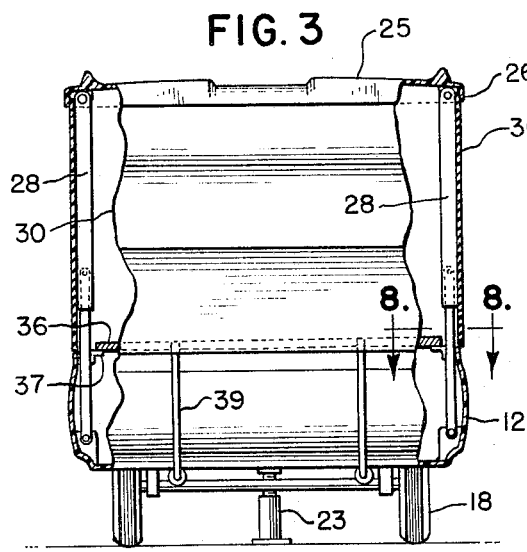
Figure 4:
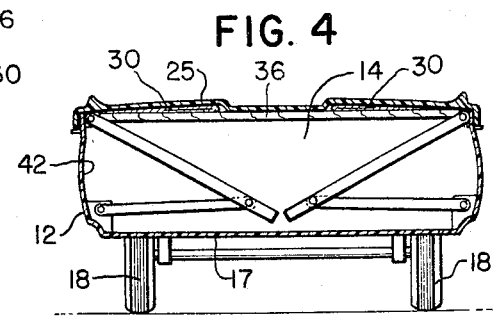

FIGS. 3 and 4 are end elevational views, partly in section as seen generally from lines 3—3 and 4—4, respectively, of FIGS. 2 and 1;

FIG. 5 is an enlarged end elevational view, similar to FIGS. 3 and 4 except showing the trailer in a partially closed condition of the roof and side closure means support used in the trailer of FIG. 1;

FIG. 6 is an enlarged end elevational view, similar to FIG. 5, except showing an alternate embodiment of the roof and side closure means support;

FIG. 7 is a top plan view, shown generally in schematic as seen from line 7—7 of FIG. 6, a cable network pulling arrangement for raising and lowering the roof and side closure means support used in FIG. 6;

FIG. 8 is an enlarged top sectional view, as seen generally from line 8—8 of FIG. 3, showing details of construction of the subject trailer; and FIG. 9 is a partial end elevational view, similar to FIGS. 5 and 6, of still a different embodiment of a roof and side closure means support that can be used according to this invention.

The subject trailer 10 includes a body 12 having a front wall 13, rear wall 14, opposed side walls 16, and a floor 17 connecting the lower edges of the walls. Wheels 18 are appropriately mounted on the body 12 and a drawbar 20 is secured to the body for connection to a pulling vehicle (not shown), as is well known in the art. Jack means 22 and 23 provided at the front and rear of the trailer can be extended to stabilize the trailer when it is parked. A roof 25 is supported on the trailer body in the closed position of the trailer and presents side skirts 26 overlapping the body walls to make the closed trailer weatherproof. Corner supports 28 elevate the roof vertically above the trailer body in the opened position of the trailer. Foldable water repellant material, such as canvas or nylon, is connected between the roof and the body to provide enclosing side wall structure 30 for the trailer when it is opened. Door means 32 in the body and side wall structure give access to the defined trailer enclosure.

To provide maximum enclosure volume for a given overall body length, wings or bays 34 are extended off the front and rear ends of the trailer. Each of the bays includes a sliding base element 36 movably supported on opposing ledges 37 of the body side walls to be extended to the open overhanging position shown in FIG. 1, and be supported in place by angle brackets 39 between the base and the body. Appropriate frame elements (not shown) connected between the base element and canvas operate to hold the canvas in near taut condition.

As is common in this type trailer, the bay or wing areas are used as sleeping quarters and the beds extend in length across the width of the trailer. Because many state laws provide for maximum exterior widths of this type trailer of 80 inches and to achieve a bed length in excess of six feet, many prior art trailers of this type located the corner supports outside of the body side walls.

A basic improvement of this trailer is the inside location and arrangement of the corner supports while still accommodating a full size bed in the bay section. The appearance of the subject trailer is also improved when the trailer is closed since the supports are inside of the trailer and out of view.

The four corner supports each includes a pair of posts pivoted to one another and to the trailer body and roof section. The pivotal connection of the posts to the body, to the roof, and between the posts themselves are formed on axes that extend in a direction substantially longitudinally of the trailer, to provide that the posts articulate toward one another from the side walls and are disposed adjacent the front and rear walls of the frame between the roof and floor when the trailer is closed. This position is shown generally in FIG. 4. The side walls are wider across their intermediate areas, as at 42, than across their open tops 44, and the lower pivotal connections of the posts are disposed outwardly of vertical alignment with the open tops. The tops of the side walls are recessed outwardly in the area of the posts, as at 46, to provide that each post can be extended vertically from its pivotal connection and is received in its adjacent recess. In this manner, the posts can be separated from one another in the area where the bed structure commonly is to be withdrawn by a minimum separation in excess of the bed length. Also, the body side walls adjacent the recesses and the bed structure confine the post in vertical alignment and securely support the trailer roof and canvas side wall structure.

The straightening of the posts relative to one another causes the roof to be lifted, and conversely, the inclining of the post relative to one another tends to bring the roof closer to the body. To assist the opening and closing of the trailer by providing a lifting force to be exerted by the post construction itself, a tension line is connected at one of its ends to one of the posts and is extended transversely to that post and is provided with a tension force. The tension force can be in the form of a coil spring or a pulley and cable arrangement. Tension applied to the line thereby tends to straighten the articulated posts until counteracted by the weight of the roof and canvas side walls.

In the embodiment in FIG. 5, post 50 is connected to roof 25 at pivot 51, post 52 connected to the body at pivot 53, and the posts are connected together at pivot 54. A tension line 55 is connected at 56 to the end of post 50 and guided over pin 57 in post 52 to within the post. A spring 58 is connected between the end 59 of the tension element 55 and the pivot 53. Tension on the line 55 thus pulls lever 50 to force it to rotate in a counterclockwise direction about pivot 54, which motion causes the pivot 54 to move to the right in the figure and to elevate the roof 25. The spring 58 is sized to counterbalance the weight of the roof 25 and the side wall structure 30.

In the embodiment disclosed in FIG. 6, post 70 is connected at pivot 72 to roof 25, post 71 is connected at pivot 73 to the body 12, and the posts are connected at pivots 74 to guide element 75. The tension element 76 is secured to post 70 at pin 77 and is guided about pins 78 and 79 on the guide member 75 and about the pin 80 on post 71 to within the post. The line 76 is then guided about pivot 73 and pulley 81 supported by the body and is wound around shaft 82 supported at its opposite ends within journals 83 in the body. The shaft 82 has a crank 84 located on the exterior of the trailer body to provide for easy rotation of the shaft. Suitable lock means (not shown) can be provided for locking the shaft in certain positions.

FIG. 7 shows in plan view a cable network suitable for lifting the post supports by means of rotation of the crank 84. The four post supports on the trailer body each have their respective tension lines 76a, 76b, 76c and 76d wound around the shaft 82 in identical directions, the two forward lines 76a and 76c being wound from the top and the two rearward lines 76b and 76d being wound from the bottom of the shaft. Thus, a similar distance is drawn in or let out of each of the lines for any rotation of the shaft 82 so that the trailer roof can be elevated or let down by rotating the crank 84. The crank can be removable from shaft 82 to provide a better appearance of the trailer.

In the embodiment disclosed in FIG. 9 the lower post 52a is pivoted at pivot 53a to the body and is connected at its upper end at pivot 54a to a post 50a. A pulley 88 is secured to the trailer body within the interior concave contour of the body side wall. A tension line 89 is connected to post 52a at pin 90 and is wound around the pulley 88 and connected to appropriate tension producing mechanism such as a spring or the crank and shaft combination. In the embodiment shown, a crank 84a and shaft 82a arrangement is used. The pin 90 is spaced from the pivot 53a a distance equal to the spacing between the pulley 88 and pivot 53a to provide for maximum mechanical advantage. The overlap of the post 50a relative to post 52a, and the confinement of the post 52a within the recess between the bed frame 36 and body side wall holds the post in aligned vertical position to stabilize the elevated roof.

An integral cap 92 is provided to support the bed frame base 36, to support the roof 25 when the trailer is closed, and further to hold the lower end of the side wall structure 30. The cap can be formed as an extrusion to connect to the top edge of the side wall 16 and extend between the corner supports 28. Thus, the lower end of the cap has an open channel for receiving the top edge of the side wall. The inwardly directed ledge 37 is integral with the cap and is suitable by means of a like ledge on the opposite side of the trailer to support a bed frame 36 spanning the walls. The ledge 37 is formed at the top of the cap so that the bed frame can slide over the adjacent end wall to its extended position as shown in FIG. 8. Similarly, ledge 93 is formed at the lower end of the cap and is outwardly directed to be engaged by the skirt 26 of the roof when the trailer is closed. This supports the roof in the closed position and further maintains the trailer weatherproof. The cap 92 has an open top that is wider at its central section than across the open top, and the side wall structure 30 has a bead 94 formed thereon which can be fitted axially into the opening but not across the narrow open top thereof. This holds the side wall structure 30 to the cap 92 and to the body. The side closure structure 30 is also secured to the base frame 36 at its edge 95, and is removably secured to the bottom edge of the base frame at the sides of the bays by means of snaps 96 on the underside of the frame (see FIG. 5). The snaps can be removed to separate the sides of the bay to permit the bed frame to be slid into the closed position between the body side walls. A weather flap 97 seamed at 98 to the side wall structure 30 extends over the connection of the side structure to the body 12 to help weatherproof the trailer. The flap 97 can be free at its lower end to permit sliding it upwardly past the cap 92 and into the trailer to allow the roof skirt 26 to encompass the cap when the trailer is closed. In the erected condition, flap 97 can be connected by means of snap 99 to the front and rear section of the trailer.

Another important development of this invention is the material used for and manner of forming the trailer body and roof. The body and roof are formed from an A.B.S. (acrylonitrile-butadiene-styrene) thermoplastic such as the U.S. Rubber Company product having the trade name Royalex. The material is initially a laminated flat sheet consisting of an inner core of expandable closed cell foam, sandwiching layers on the core of the U.S. Rubber A.B.S. product of Royalite, and outer ultra violet protection skin or film. The sheet is vacuum formed to the contour of the trailer body within a female mold, the sheet being initially secured to the top of the mold and a vacuum then being drawn in the mold. The sheet is generally heated to approximately 300° to 350° F., and the vacuum is approximately 20 to 27 inches. A mechanical assist, such as a top plunger, can be abutted directly against the sheet to force it against the mold walls, particularly in deep draw areas. By this vacuum forming technique and by using this A.B.S. thermoplastic, the body can be made as an integral unit having the side walls 13, 14, and 16 integral with one another and with the floor 17. Also, wheel wells (not shown) can be provided integral with the trailer body. The body formed of this material is extremely lightweight, is weatherproof, and further is structurally independent and durable against impact.

What is claimed is:

1. For use in a wheeled trailer having an open top body including a floor and opposed front and rear end walls and opposed side walls upstanding therefrom, a rigid roof, foldable side closure structure connected between the roof and the body, and retractable corner supports for holding the roof spaced vertically above the body with the side closure structure extended therebetween when the trailer is opened and for lowering the roof against the body when the trailer is closed, the improvement comprising the combination of opposing elongated support rails on the side walls, a bed frame extending between and being supported by the support rails, said support rails being located near the upper edges of the side walls above the level of the adjacent end wall to provide that the bed frame can be moved along the bed supports to extend over the adjacent end wall when the trailer is opened and can be moved to entirely between the side walls when the trailer is closed, said support rails further being spaced from the adjacent end wall distances slightly in excess of the corner supports to provide that the corner supports are disposed between the adjacent end wall and the bed frame in the trailer closed position, each of the corner supports including a pair of posts having connections at their remote ends, respectively, relative to the roof and the body, and having connections near their adjacent ends relative to each other, and all these connections being pivotal about axes that extend longitudinally of the trailer body to permit inward and outward articulation of the posts between the opened and closed positions of the trailer.

2. A trailer improvement according to claim 1, wherein the side walls have formed in the regular contour of the open tops outwardly directed recesses each disposed adjacent a corner support and comparable in size to the support, and wherein the corner support connections to the body are on the inside thereof in general vertical alignment with the recesses to provide that said supports fit in the recesses and extend vertically from the body connections when the trailer is opened.

3. A trailer improvement according to claim 1, wherein a first post of one pair of posts is C-shaped and embraces the second post of said pair, wherein the pivotal connection of the posts relative to each other is at the end of the second post and is between the ends of the first post, wherein an antifriction element is secured relative to the pivotal connection of the post to the body and is generally adjacent the adjacent end of the first post, wherein a tension line is connected from the adjacent end of the first post around the antifriction element, and wherein means pulling the tension line tends to straighten the posts until counterbalanced by the weight of the roof and side closure structure.

4. A trailer improvement according to claim 3, wherein the body side walls are contoured convex outwardly to cause the distance between the side walls across the inside of the trailer body at their open tops to be less than below the tops, and wherein said antifriction element is secured to the side wall below the top thereof in near transverse alignment with the adjacent end of the first post when the trailer is in the open position.

5. A trailer improvement according to claim 1, wherein a C-shaped element embraces the posts and has the pivotal connection thereto at the adjacent ends thereof, wherein a tension line is connected at one end to one of the posts at a location spaced from said pivotal connection and is guided past the C-shaped element to the second post at a location spaced from the pivotal connection, and wherein means pulling the tension line tends to straighten the posts until counterbalanced by the weight of the roof and side closure structure.

6. A trailer improvement according to claim 1, wherein support ledges are secured to the body side walls near their tops and extend transversely of the side walls in opposite outward directions, and wherein the roof has downwardly extended skirts adapted to telescope over the side walls and abut the ledges to support the roof in the trailer closed position.

7. A trailer improvement according to claim 6, wherein the support ledges and support rails are integral with one another and with a downwardly open U-shaped, elongated cap that fits over the top of the body side wall.

8. A trailer improvement according to claim 7, wherein said cap has an upwardly directed C-shaped opening that is narrower across its open top than across its center section, and wherein the foldable side closure structure has its lower end enlarged along a bead that fits within the center section of the C-shaped opening and is confined by the narrower open top against vertical movement to hold said structure to said trailer body.

9. A trailer improvement according to claim 8, wherein a foldable flap is secured along a continuous joint to the side closure structure on the exterior side thereof and is extended, in the trailer opened position, over the cap and support ledge thereof.

References Cited by the Examiner

UNITED STATES PATENTS 1,386,943    8/1921    Moore _____ 296—23

BENJAMIN HERSH, *Primary Examiner.*

P. GOODMAN, *Assistant Examiner.*